US006521330B2

(12) United States Patent
Finn et al.

(10) Patent No.: US 6,521,330 B2
(45) **Date of Patent: *Feb. 18, 2003**

(54) FLOW COATING PROCESS FOR MANUFACTURE OF POLYMERIC PRINTER AND BELT COMPONENTS

(75) Inventors: Patrick J. Finn, Webster, NY (US); Anthony J. Formicola, Webster, NY (US); Joseph R. Blaszak, Penfield, NY (US); Robert M. Ferguson, Penfield, NY (US); Laurence J. Lynd, Macedon, NY (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/894,626

(22) Filed: Jun. 28, 2001

(65) Prior Publication Data

US 2001/0036539 A1 Nov. 1, 2001

Related U.S. Application Data

(62) Division of application No. 08/672,493, filed on Jun. 26, 1996.

(51) Int. Cl.[7] .............................. B32B 3/00; B32B 5/00

(52) U.S. Cl. .......................... 428/212; 428/156; 428/98

(58) Field of Search ........................... 428/195, 98, 156

(56) References Cited

U.S. PATENT DOCUMENTS 5,871,832 A * 2/1999 Finn et al. .................... 428/98
6,316,113 B1 * 11/2001 Russell, Jr. et al. ......... 428/450

* cited by examiner

*Primary Examiner*—Cynthia H. Kelly
*Assistant Examiner*—L Ferguson
(74) *Attorney, Agent, or Firm*—John S. Wagley; Joseph A. Young

(57) ABSTRACT

A polymeric printing member for use in a printing machine is provided. The polymeric printing member includes a substrate and a coating applied to the substrate. The coating is applied to the substrate by rotating the substrate about its longitudinal axis and applying the coating from an applicator to the substrate in a spiral pattern in a controlled amount so that substantially all the coating that exits the applicator adheres to said substrate.

19 Claims, 8 Drawing Sheets

FLOW COATING PROCESS FOR MANUFACTURE OF POLYMERIC PRINTER AND BELT COMPONENTS

This is a division of application Ser. No. 08/672,493 filed Jun. 26, 1996.

The present invention relates to a method and apparatus for a printing system. More specifically, the invention relates to printer rolls and belts for printing systems.

Cross reference is made to the following application filed concurrently herewith Ser. No. 08/669,761 entitled "Leveling Blade for Flow Coating Process for Manufacture of Polymeric Printer Roll and Belt Components" by Patrick J. Finn et al.

The features of the present invention are useful in the printing arts and more particularly in electrophotographic printing. In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto by fusing the toner image to the paper to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

Several components in the electrophotographic printing process described above are in the form of polymeric rolls and belts. Fusing rolls which are used to fix the toner image on a substrate represent a component that is typically in the form of polymeric rolls and belts. Also included among these components are bias charge rolls (BCRs) and bias transfer rolls (BTRs) which electrostatically charge the photoreceptor. Other forms of polymeric rolls and belts include the pressure or backup roll used with a fusing roll to fix the toner image on a substrate. Another form of a polymeric rolls and belts are donor rolls which transfer oil to the fuser roll that assists in releasing the toner from the fuser roll. A further form of polymeric rolls and belts include intermediate transfer rolls and belts that transfer developed images. Another form of polymeric rolls and belts include photoconductive belts and rolls. Other forms of polymeric rolls and belts include those belts and rolls used in Hybrid Scavangeless Development (HSD) as disclosed in U.S. Pat. No. 4,868,600 to Hays et al. and in U.S. Pat. No. 5,172,170 to Hays et al., the relevant portions thereof incorporated herein by reference. All of these a polymeric rolls and belts are typically manufactured by spraying or by dipping A particularly difficult polymeric rolls and belts to manufacture are fuser rolls and belts. The elevated temperatures and pressures of these rolls and the accurate size and finish requirements necessary to insure proper copy quality make their manufacture difficult.

The fusing of the toner image to the paper to form a permanent record of the image is an important part of the xerographic process. Fusing of the toner image is typically done by heat fixation. The heat fixation may be in the form of radiation, conduction, convection or induction. Most modem xerographic processes utilize conduction heating of the toner image to adhere the image to the paper. This is performed by a fusing roll in contact with the toner image. A fusing roll is placed in rolling contact with a backup roll forming a nip therebetween. The paper having the toner image laying thereon is fed between the rolls through the nip. Heat from the fusing roll together with the pressure within the nip between the fuser roll and the backup roll serve to fuse the image to the paper. Heat is typically applied internally within the roll and is transferred through the substrate of the roll onto the periphery of the roll and onto the paper. The rolls typically include a thermally conductive substrate with a surface layer which is also thermally conductive. To assure uniform transfer of the image onto the paper, typically the fuser roll coating is conformable to the paper. For example, the coating may be in the form of a rubber or polymer material, e.g. a fluoroelastomer coating.

Applying fluoroelastomer and other rubber type coatings to fuser roll substrates is fraught with many problems. The coating may be applied to the substrate by two typical methods which are dipping of the substrate into a bath of coating solution or spraying the periphery of the substrate with the coating material.

Spraying is the typical method for the manufacture of fluoroelastomer rollers. The spraying process is very slow and costly. Also, the spraying process requires having the coating solution in a form that is very volatile including many volatile organic chemicals. Further, the spraying process is very prone to air pockets or pits forming in the coating. These pits or air pockets in the coating material of the roll result in improper fusing and poor image quality. Because of the nature of the spray process, much of the coating material is lost in the atmosphere requiring an excess amount of the expensive coating material utilized. Also, the loss of the volatile chemicals result in expensive containment costs for systems to contain the volatile chemicals as well as disposal costs of these materials.

Recently a process has been attempted to drip material over a horizontally rotating cylinder. With this process a portion of the material adheres to the cylinder and the remainder drips from the cylinder. The amount of material added to the roll is not precisely controlled as the percentage that adheres varies as parameters change over the production run. Also the material forms a wavy surface where the material is poured.

This invention is intended to alleviate at least some of the above-mentioned problems for at least some of the several components in the electrophotographic printing process described above which are in the form of polymeric rolls and belts.

The following disclosures may be relevant to various aspects of the present invention:

U.S. Pat. No. 5,455.077

Patentee: Yamamoto, et al.

Issue Date: Oct. 3, 1995

U.S. Pat. No. 5,448,342

Patentee: Hays, et al.

Issue Date: Sept. 5, 1995

U.S. Pat. No. 5,416,566

Patentee: Edmunds, et al.

Issue Date: May 16, 1995

U.S. Pat. No. 5,386,277

Patentee: Hays, et al.

Issue Date: Jan. 31, 1995

U.S. Pat. No. 5,378,525

Patentee: Yamamoto, et al

Issue Date: Jan. 3, 1995

U.S. Pat. No. 5,300,339

Patentee: Hays, et al.

Issue Date: Apr. 5, 1994

U.S. Pat. No. 5,245,392

Patentee: Behe, et al.

Issue Date: Sep. 14, 1993

U.S. Pat. No. 5,177,538

Patentee: Mammino, et al.

Issue Date: Jan. 5, 1993

U.S. Pat. No. 4,891,081

Patentee: Takahashi, et al.

Issue Date: Jan. 2, 1990

U.S. Pat. No. 4,278,733

Patentee: Benzinger

Issue Date: Jul. 14, 1981

U.S. Pat. No. 4,034,709

Patentee: Fraser, et al.

Issue Date: Jul. 12, 1977

U.S. Pat. No. 3,616,046

Patentee: Benzinger, et al.

Issue Date: Jun. 10, 1968

Rubber World Magazine

New Roll-Covering Process Uses RTV Silicones

Author: Kasnick

Published Date: May 1975

U.S. Pat. No. 5,455.077 discloses a crowned resilient roll of continuously increasing diameter from the axially opposed ends. The resilient roll includes a columnar roll body formed of a resilient material and a coating layer formed on an outer circumferential surface of the roll body. The coating is applied to a rotating body with the speed of the rotating body being decreased in the middle of the roll.

U.S. Pat. No. 5,448,342 discloses a coated transport roll including a core with a coating of charge transporting molecules and an oxidizing agent dispersed in a resin. The transporting molecules includes aryldiamine molecules.

U.S. Pat. No. 5,416,566 discloses a magnetic roll assembly including a rotatable nonconductive shell surrounding a magnetic member to prevent eddy currents during rotation. The substrate has an elastomer coating formed over it.

U.S. Pat. No. 5,386,277 discloses a coated toner transport roller including a core with a coating of an oxidized polyether carbonate.

U.S. Pat. No. 5,378,525 discloses a crowned resilient roll of continuously increasing diameter from the axially opposed ends. The resilient roll includes a columnar roll body formed of a resilient material and a coating layer formed on an outer circumferential surface of the roll body. A protective layer of N-methoxymethlated nylon is applied to the coating.

U.S. Pat. No. 5,300,339 discloses a coated toner transport roll containing a core with a coating of transporting molecules dispersed in a binder and an oxidizing agent of ferric chloride and/or trifluoroacetaic acid. The coating possesses a relaxation time of from about 0,0099 millisecond to about 3.5 milliseconds and a residual voltage of from about 1 to about 10 volts.

U.S. Pat. No. 5,245,392 discloses a donor roll for conveying toner in a development system. The roll includes a core of an electrically conductive material such as aluminum. The core is coated with a resin, for example a phenolic, to obtain a suitable conductivity to facilitate a discharge time constant of less than 300 microseconds.

U.S. Pat. No. 5,177,538 discloses a donor roll for a printer formed by mixing resin particles with conductive particles and subsequently extruding or centrifugal casting the mixture into a cylindrical shell. The shell is cut to the desired length and journals are attached to each end of the shell. The resin particles are thermoset particles preferably phenolic resin particles, and the conductive particles are preferably graphite particles.

U.S. Pat. No. 4,891,081 discloses a method of molding and a foamed resin molding in which a skin layer is formed by pressing an expandable film against and into conformity with cavity walls of a mold or a bag-like cover member by foaming pressure of a foamable resin and a formed resin body molded concurrently and integrally under the skin layer.

U.S. Pat. No. 4,278,733 discloses a laminate product and method of making the same involving a base material such as cellulose fibrous materials impregnated with a cured mixture of aniline, phenol, formaldehyde and epoxy resin, which laminate has electrical and mechanical properties with improved heat resistance over previous materials.

U.S. Pat. No. 4,034,709 discloses a developer roll for a xerographic copier. The roll includes a tubular member made a non-magnetic metal for example aluminum. The roll is coated with a layer of styrene-butadiene. Magnets are disposed in the interior of the tubular member.

U.S. Pat. No. 3,616,046 discloses a laminated product possessing good physical and electrical properties made with an impregnating resin which is a reaction product of aniline, phenol and formaldehyde. These resins impart unusually good electrical and physical properties to the laminated product and are sufficiently water soluble as to allow their water content to be adjusted for direct, one stage impregnation of cellulose fiber materials such as paper.

"New Roll-Covering Process Uses RTV Silicones", discloses a technique for covering metal rolls with silicone rubber. To produce the coating a prepared mandrel is centered and locked in position on a standard metal working lathe. The elastomer is applied to the mandrel by pumping from a pail through a trough onto the mandrel.

In accordance with one aspect of the present invention, there is provided a polymeric printing member for use in a printing machine. The polymeric printing member includes a substrate and a coating applied to the substrate. The coating is applied to the substrate by rotating the substrate about its longitudinal axis and applying the coating from an applicator to the substrate in a spiral pattern in a controlled amount so that substantially all the coating that exits the applicator adheres to said substrate.

In accordance with another aspect of the present invention, there is provided a printing machine including a polymeric printing member. The roll includes a substrate and a coating applied to the substrate. The coating is applied to the substrate by rotating the substrate about a longitudinal axis thereof and applying the coating from an applicator to the substrate in a spiral pattern in a controlled amount so that substantially all the coating that exits the applicator adheres to the substrate.

In accordance with a further aspect of the present invention, there is provided a method for manufacturing a polymeric printing member for use in a printing machine. The method includes the steps providing a generally cylindrically shaped substrate, rotating the substrate about a longitudinal axis thereof, and applying the coating from an applicator to the substrate in a controlled amount so that substantially all the coating that exits the applicator adheres to the substrate.

BRIEF DESCRIPTION OF THE DRAWINGS

The invention will be described in detail herein with reference to the following figures in which like reference numerals denote like elements and wherein.

Figure 1:
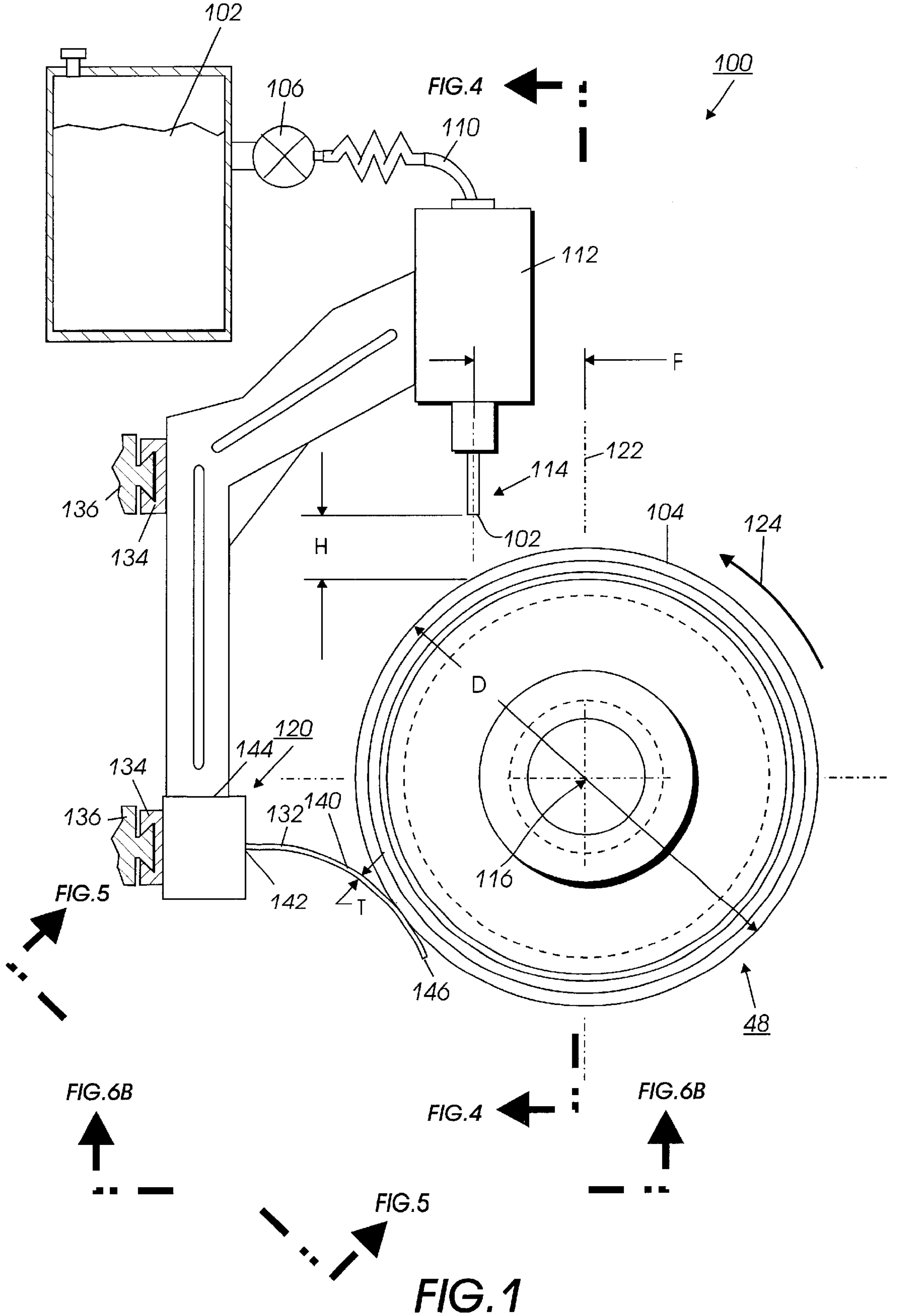
FIG. 1 is an end view of a flow coated fuser roll being prepared on a turning apparatus according to the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to identify identical elements.

Figure 2:
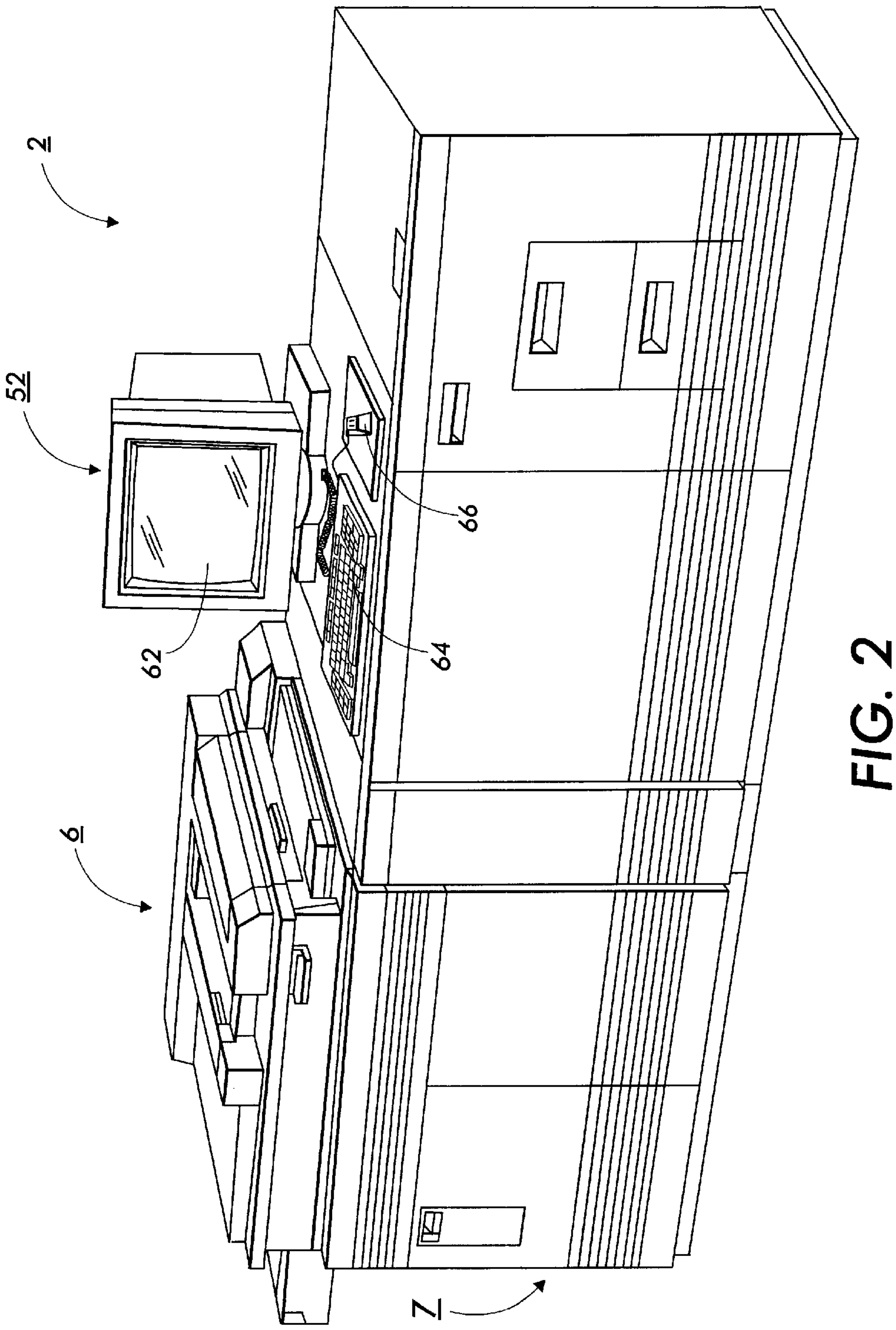
FIG. 2 is a perspective view of an illustrative electrophotographic printing machine incorporating the flow coated fuser roll of the present invention therein.
Figure 3:
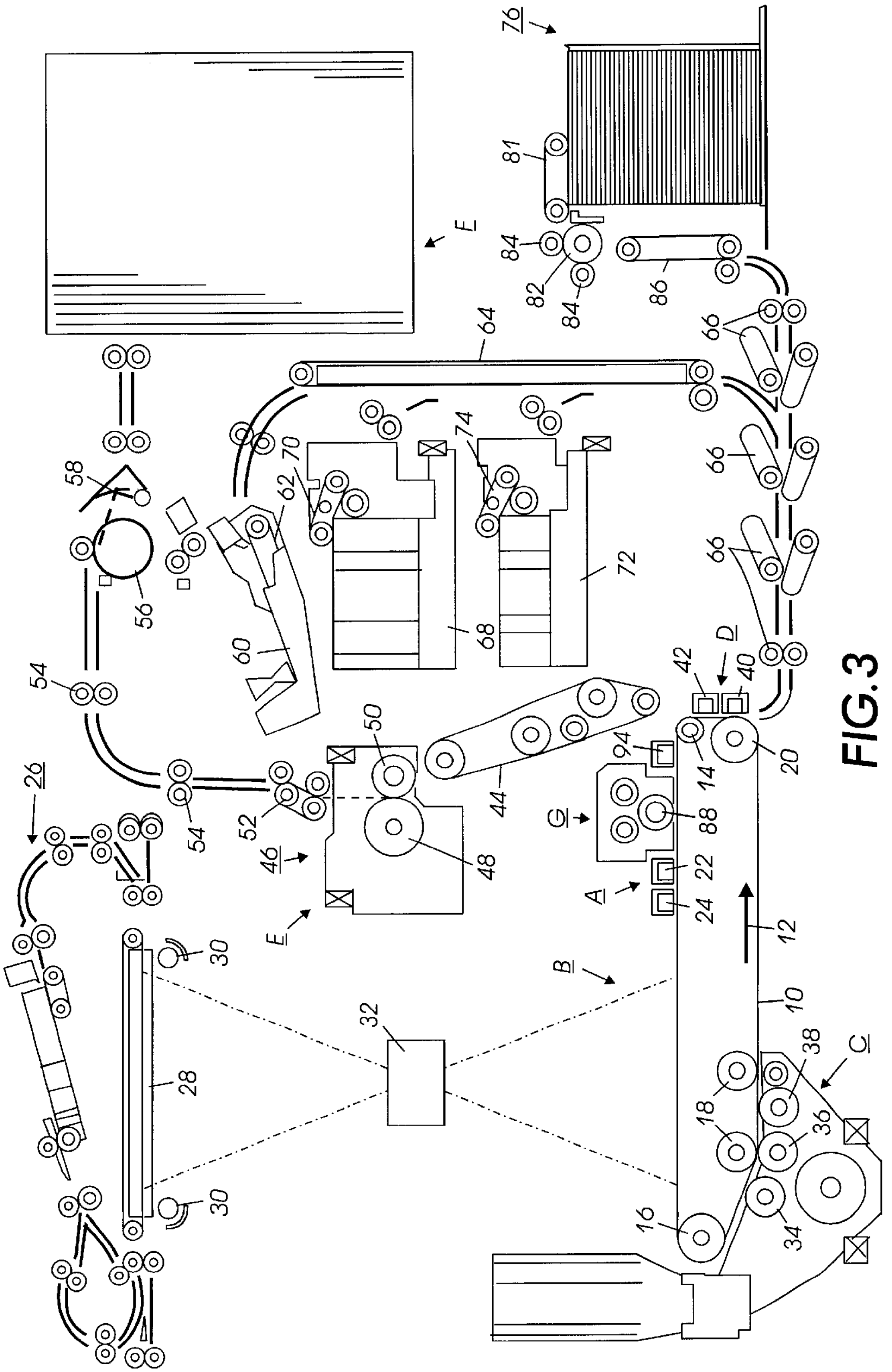
FIG. 3 is a schematic elevational view of the printing machine of FIG. 2.

Referring first to FIG. 2 is an illustrative electrophotographic printing machine 2 incorporating the flow coated fuser roll of the present invention therein is shown. The machine includes an input device 6 such as a raster input scanner (RIS) An operator interface may be in the form of a cathode ray tube (CRT) including screen 62 for displaying the user interface commands. A keyboard 64 and a mouse 66 may be provided to provide for user interface with the machine 2. Machine controls 7 are housed in the machine to control its operation.

Figure 5:
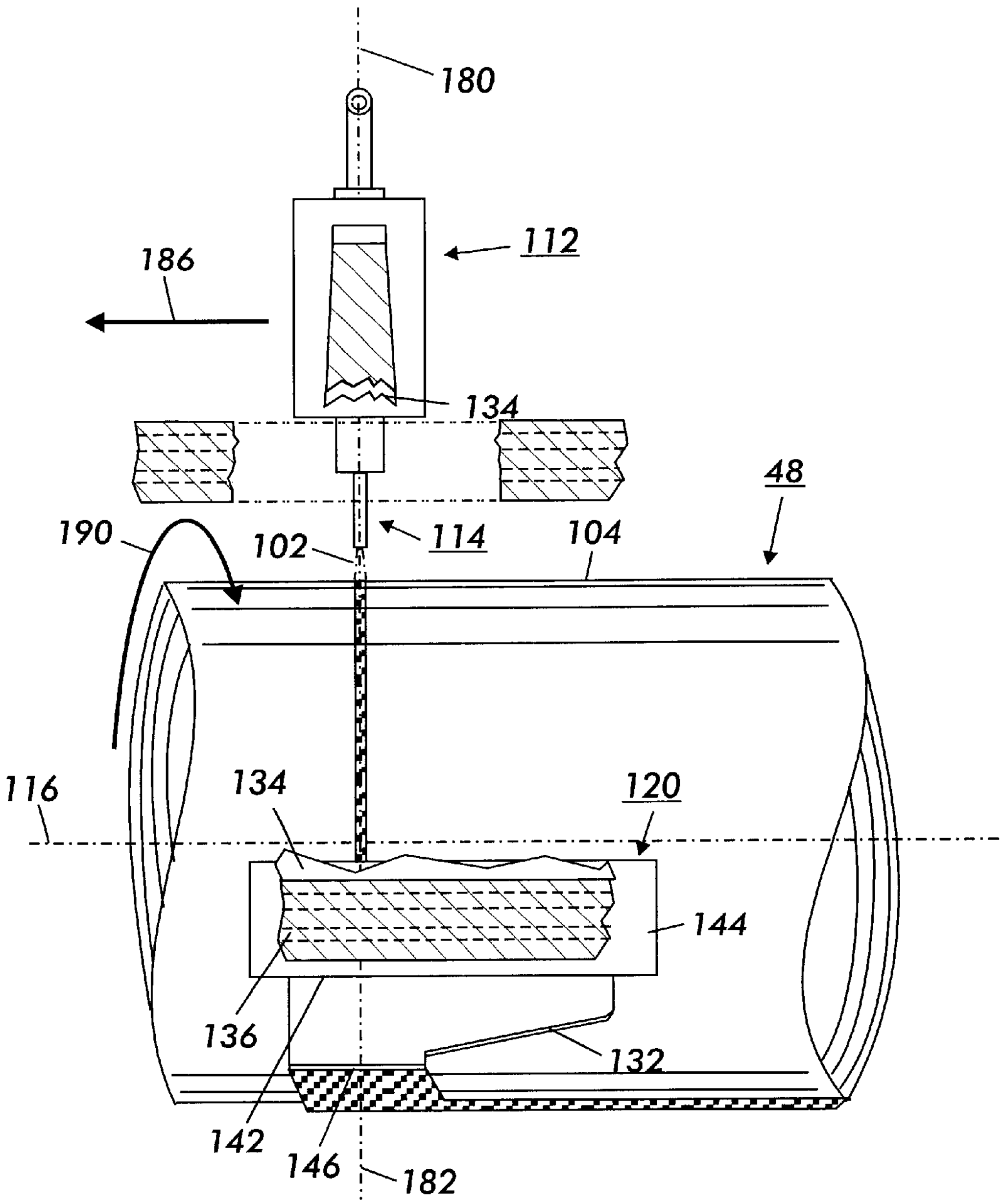
FIG. 5 is a partial plan view along the line 5—5 in the direction of the arrows of the FIG. 1 fuser roll.

Referring now to FIG. 5 an electrophotographic printing machine incorporating the features of the present invention therein are schematically depicted. It will become evident from the following discussion that the set transfer device of the present invention may be employed in a wide variety of machines and is not specifically limited in its application to the particular embodiment depicted herein.

Referring to FIG. 5 of the drawings, the electrophotographic printing machine employs a photoconductive belt 10. Preferably, the photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated Mylar™. The interface layer. aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. Stripping roller 14 and idler roller 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At imaging station B, a document handling unit indicated generally by the reference numeral 26 is positioned over platen 28 of the printing machine. Document handling unit 26 sequentially feeds documents from a stack of documents placed by the operator faceup in a normal forward collated order in the document stacking and holding tray. A document feeder located below the tray, forwards the bottom document in the stack to a pair of take-away rollers. The bottom sheet is then fed by the rollers through a document guide to a feed roll pair and belt. The belt advances the document to platen 28. After imaging, the original document is fed from platen 28 by the belt into a guide and feed roll pair. The document then advances into an inverter mechanism and back to the document stack through the feed roll pair. A position gate is provided to divert the document to the inverter or to the feed roll pair. Imaging of the document is achieved by lamps 30 which illuminate the document on a platen 28. Light rays reflected from the document are transmitted through the lens 32. Lens 32 focuses light images of the document onto the charged portion of the photoconductive belt to selectively dissipate the charge thereon. This records an electrostatic latent image on the photoconductive belt which corresponds to the informational areas contained within the original document.

Obviously, electronic imaging of page image information could be facilitated by a printing apparatus utilizing electrical imaging signals. The printing apparatus can be a digital copier including an input device such as a raster input scanner (RIS) and a printer output device such as a raster output scanner (ROS), or, a printer utilizing a printer output device such as a ROS. Other types of imaging systems may also be used employing, for example, a pivoting or shiftable LED write bar or projection LCD (liquid crystal display) or other electro-optic display as the "write" source.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets can be attached to one another by either a binder or a stapler. In either case, a plurality of sets of documents are formed in finishing station F. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from secondary tray 68. The secondary tray 68 includes an elevator driven by a bi-directional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from auxiliary tray 72. The auxiliary tray 72 includes an elevator driven by a directional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray. 72 are secondary sources of copy sheets. The high capacity sheet feeder, indicated generally by the reference numeral 76, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

It is believed that the foregoing description is sufficient for purposes of the present application to illustrate the general operation of an electrophotographic printing machine incorporating a polymeric printing roll manufactured from the roll flow process of the present invention therein.

According to the present invention and referring to FIG. 1, apparatus 100 for coating polymeric printing rolls or belts for example xerographic fuser roll 48 is shown. It should be appreciated that the apparatus 100 may be utilized for flow coating any of a number of polymeric printing rolls or belts including but not limited to bias charge rolls (BCRs), bias transfer rolls (BTRs), pressure rolls, backup rolls, fuser donor rolls, intermediate transfer rolls and belts, photoconductive belts and rolls, development rolls and belts and development donor rolls, and Hybrid Scavangeless Development. rolls and belts.

The apparatus 100 is used to apply coating solution 102 to periphery 104 of the fuser roll 48. The coating solution is pumped via pump 106 through a conduit typically in the form of a pipe 110 to an applicator 112 including nozzle 114 through which the coating solution 102 flows onto periphery 104 of the roll 48.

According to the present invention, the coating solution 102 is applied to the periphery 104 in a spiral fashion with the fuser roll 48 rotating about its longitudinal axis 116, while the applicator 112 translates in a direction parallel to the longitudinal axis 116 of the fuser roll 48. The coating solution 102 is thus applied to the periphery 104 of the fuser roll 48 in a spiral fashion. The application of the coating is similar to the path of a cutting tool when turning the periphery of a shaft in a standard lathe. This process may be called (Flow Coating).

According to the present invention applicants have found that by accurately controlling the amount of coating solution 102 that is displaced through pump 106 and/or by controlling accurately in any manner the amount of coating solution 102 that is released at the nozzle 114 of applicator 112, substantially all the coating solution 102 that passes through the nozzle 114 adheres to the roll 48. Applicant have been successful in obtaining coating layer of 0.0020 inches with a tolerance range of +/−0.0001 inches. Being able to control the thickness of the coating with such precision will obviate the need for grinding and other post coating operations particularly for use in fusing color images where glossy finish on images is preferred. Applicant have found that for black and gray tone images where a flat image is preferred the surface finish on the periphery of the roll 48 when using the Flow Coating process is too smooth and subsequent grinding and or polishing operations may be required to obtain the preferred dull or flat finish.

Apparatus 100 may have any suitable form and consists of any equipment capable of rotating the fuser roll 48 about longitudinal axis 116 while translating the applicator 112 in a direction parallel to the longitudinal axis 116. Standard CNC or engine lathes may be used for this purpose. Specialty equipment may also be designed which will rotate the fuser roll while translating the applicator. Specialized equipment may be advantageous to permit the proper enclosure of the apparatus 100 to contain the volatile coating solution and to maintain the environmental conditions necessary for quality coatings from this process.

While the invention may be practiced utilizing an apparatus 100 with an applicator 112 which applies through the nozzle 114, a spiral coating, applicants have found that when so applying the coating, the coating is applied in a thread like fashion and may have peaks and valleys on the periphery 104 of the roll 48. Applicants have found that the placement of a member in the form of guide 120 against the periphery 104 of the roll 48 as the coating solution 102 is applied to the roll, significantly improves the uniformity of the coating upon the roll 48. Preferably, the longitudinal axis 116 of the roll 48 is positioned horizontally with respect to the floor of the building in which the apparatus is housed. This configuration permits for the affects of gravity to properly distribute the coating solution 102 about the periphery 104 of the roll 48.

Similarly, the applicator 112 is preferably positioned above the fuser roll 40 so that the stream of coating solution coming from the nozzle 114 may rest upon the periphery 104 of the roll 48. Preferably, tip 120 of nozzle 114 is spaced a distance H above the periphery 104 of the roll 48. If the tip 120 is placed too far from the periphery 104 the coating solution 102 will evaporate before it reaches the periphery. If the tip 120 is placed too closely to the periphery 104, the tip will hit the periphery 104. For a roll having a diameter D of approximately four inches, the applicants have found that a distance H of approximately ¼ of an inch is adequate. Applicants have also found that positioning of the applicator 112 at a position F of approximately one inch from vertical axis 122 of the roll in the direction of rotation 124 of the roll. The dynamics of the rotation of the roll and its position on the periphery of the roll assist in the uniform distribution of the solution 102 on the periphery of the roll.

Accordingly to the present invention and referring to FIG. 1, the applicants have found that apparatus 100 preferably includes the guide 120 to assist in properly distributing the solution 102 along the periphery 104 of the roll 48. The guide includes a member 132 preferably in the form of a blade, for example, a spring steel have a thickness T of approximately 0.0015 inches.

The blade 132 is preferably connected with slide 134 of blade 132. Both the applicator 112 and the blade 132 are mounted on the slide 134 and are preferably positioned in a similar axial position along longitudinal axis 116 of the apparatus 100. The blade 132 has a first surface 140 which is parallel to and slightly spaced from the periphery 104 of the roll 48 with the coating solution 102 separating the periphery 104 from the blade 132.

While the guide 130 may have any configuration in which a first surface 140 of the blade 132 tangentially contacts the periphery 104 of the roll 48 to evenly distribute the coating solution 102, preferably the blade 132 is positioned with a fixed end 142 of the blade mounted to a base 144. The base 144 is mounted to the slide 134. It should be appreciated, however, that the blade 132 may be directly mounted to the slide 134. The blade 132 also has a free end 146 located spaced from the fixed end 142 of the blade 132.

Figure 4:
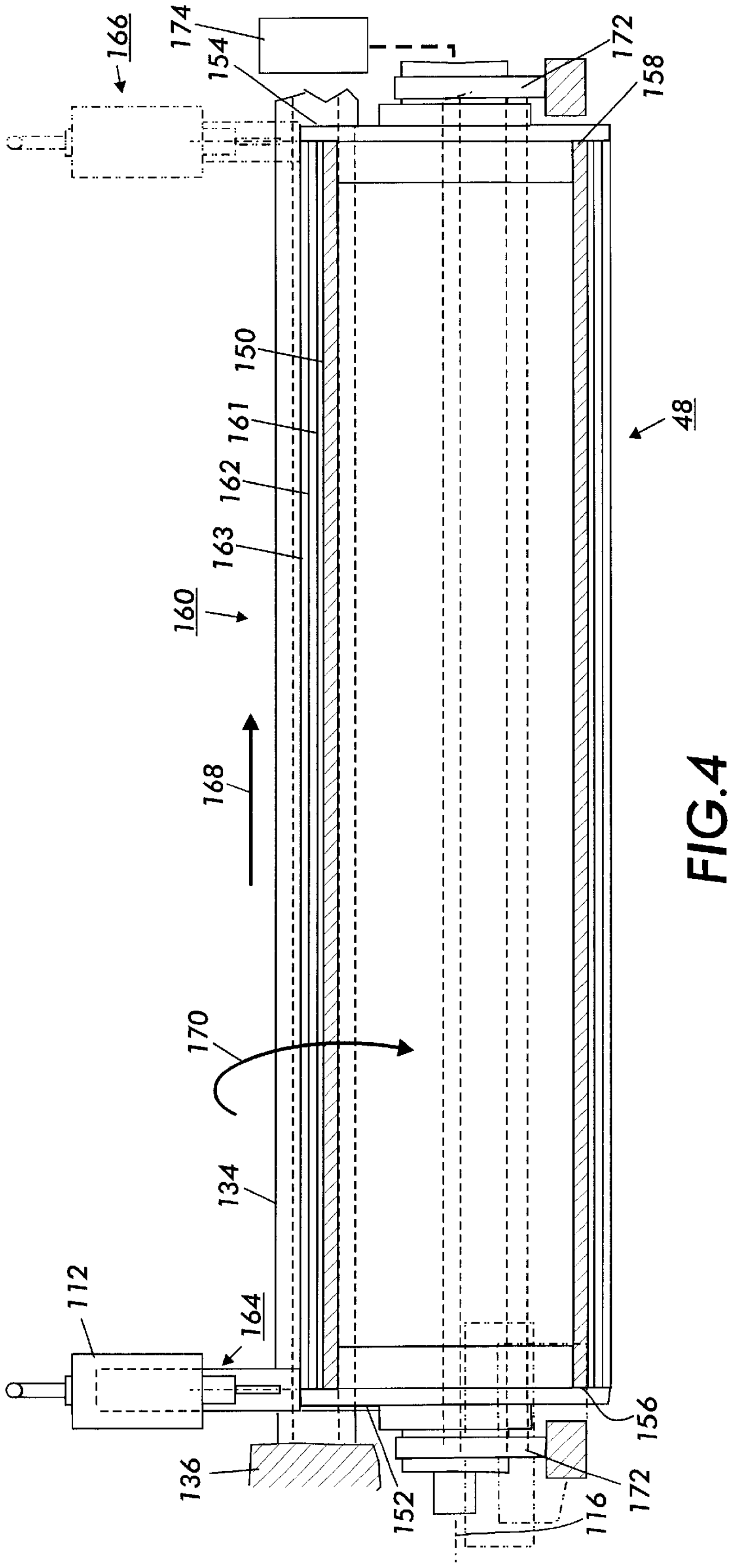
FIG. 4 is a sectional view along the line 4—4 in the direction of the arrows of the FIG. 1 fuser roll.

Referring now to FIG. 4, the fuser roll 48 and the apparatus 100 are shown in greater detail. The fuser roll 48 may be made of any suitable durable material which has satisfactory heat transfer characteristics. For example, as shown in FIG. 4, the fuser roll 48 includes a substrate in the form of a core 150 having a generally tubular shape and made of a thermally conductive material, for example, aluminum or a polymer. To provide for the driving of the roll, the roll 48 typically includes first end cap 152 and second end cap 154 located at first end 156 and second end 158 of the core 150, respectively. Coating solution 102 (see FIG. 1) is used to apply coating 160 to the core 150. The coating 160 may be made of any suitable, durable material. For example, the coating 160 may be a fluoroelastomer. Preferably, the fluoroelastomer includes an additive to increase its thermal conductivity. One such additive to obtain the thermal conductivity is aluminum oxide. While a solitary coat may be applied to the core 150, preferably the coating 160 includes three separate, distinct layers. The first of these layers which is applied to the core 150 is an adhesive layer 161. Applied to the adhesive layer 161 is base coat 162 and applied to the base coat 152 is top coat 163.

The operation of the apparatus as shown in FIG. 4 is such that the applicator 112 translates from first position 164 as shown in solid to second position 166 as shown in phantom. The applicator 112 thus travels along with the slide 134 in the direction of arrow 168. The direction of travel of the applicator 112 is parallel to longitudinal axis 116 of fuser roll 48. Concurrently with the translation of the applicator 112, the roll 48 rotates in the direction of arrow 170. The roll 48 is supported in any suitable fashion such as by feed blocks 172 and is rotated in any suitable fashion such as by driver 174 which contacts end cap 154.

Referring now to FIG. 5, the relative position of the applicator 112 relative to guide 130 is shown. Applicator 112 is positioned centrally about vertical applicator axis 180. The blade 132 of the guide 120 is positioned along the roll 48 in an axial position along the longitudinal axis 116 of the roll 48 such that the fixed end 142 of the blade 132 has a vertical centerline 182 which is in alignment along the longitudinal axis with applicator axis 180. The coating solution 102 coming from nozzle 104 is thus axially positioned in line with centerline 182 of the fixed end 142 of the blade 132. The coating solution 102 coming from the nozzle 114 forms a metered fluid layer 184 which is spirally positioned about periphery 104 of the roll 48. The applicator 112 and the guide 120 are both mounted on slide 134 and both move along in a direction parallel with longitudinal axis 116 of the roll in direction of arrow 186 as the roll 48 rotates in the direction of arrow 190.

Figure 6A:
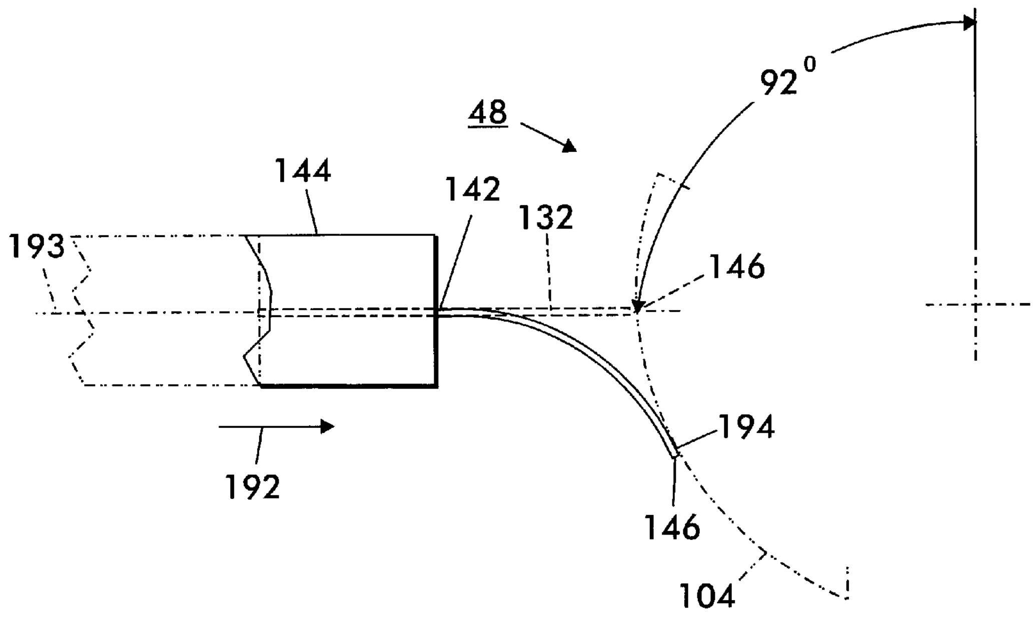
FIG. 6A is a partial plan view of a leveling blade for use with the turning apparatus of FIG. 1 according to the present invention.

Referring now to FIG. 6A, the blade 132 is shown in a relaxed state when the roll 48 is not in contact with the blade 132. The blade 132 has its fixed end 142 fixedly secured to base 144. Free end 146 of the blade 132 extends outwardly from the fixed end 142. While the blade 132 may be made of any suitable durable material, preferably the blade is made from spring steel. The blade 132 has been found to be successful when having a length of approximately 1.25 inches. Proper angular position of the blade to obtain a tangential contact of the blade upon the periphery 104 of the roll, can be accomplished by translating the base 144 in the direction of arrow 192 approximately 0.55 inches. The blade 132 is thus in tangential contact with the roll 48 at point of tangency 194. The free end 146 of the blade 132 is preferably only slightly (approximately 0.00 to 0.060 inches) past the point of tangency 194. Preferably, centerline 193 of the blade 132 is in alignment with roll 48 at a position 92 degrees from vertical.

Figure 6B:
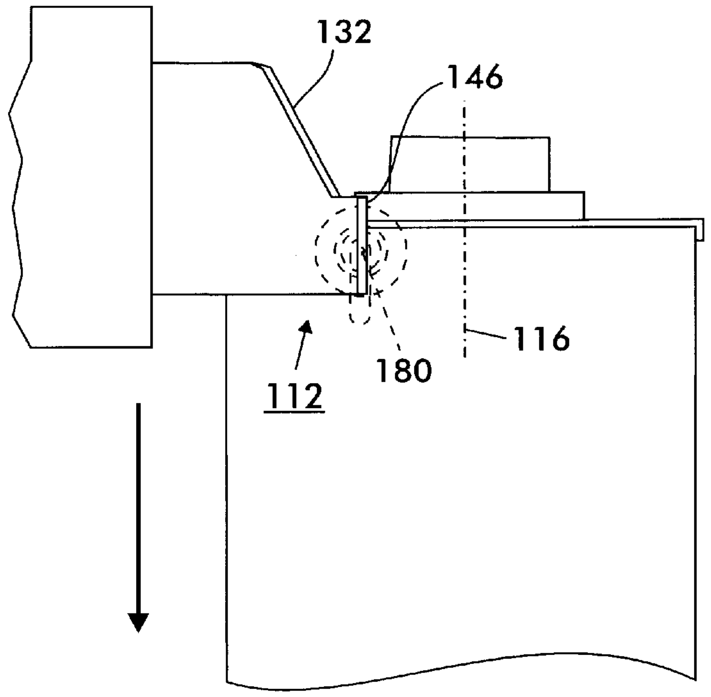
FIG. 6B is a bottom view along the line 6B—6B in the direction of the arrows of FIG. 1.

Referring now to FIG. 6B, the position of the blade 132 relative to the applicator 112 is shown looking downward in a vertical direction. For a blade having a free end 146 with a width of 0.25 inches, the applicator axis 180 is at a position along longitudinal axis 116 of roll 48 equally spaced 0.125 inches from each end of the free end 146 of the blade 132.

Figure 7A:
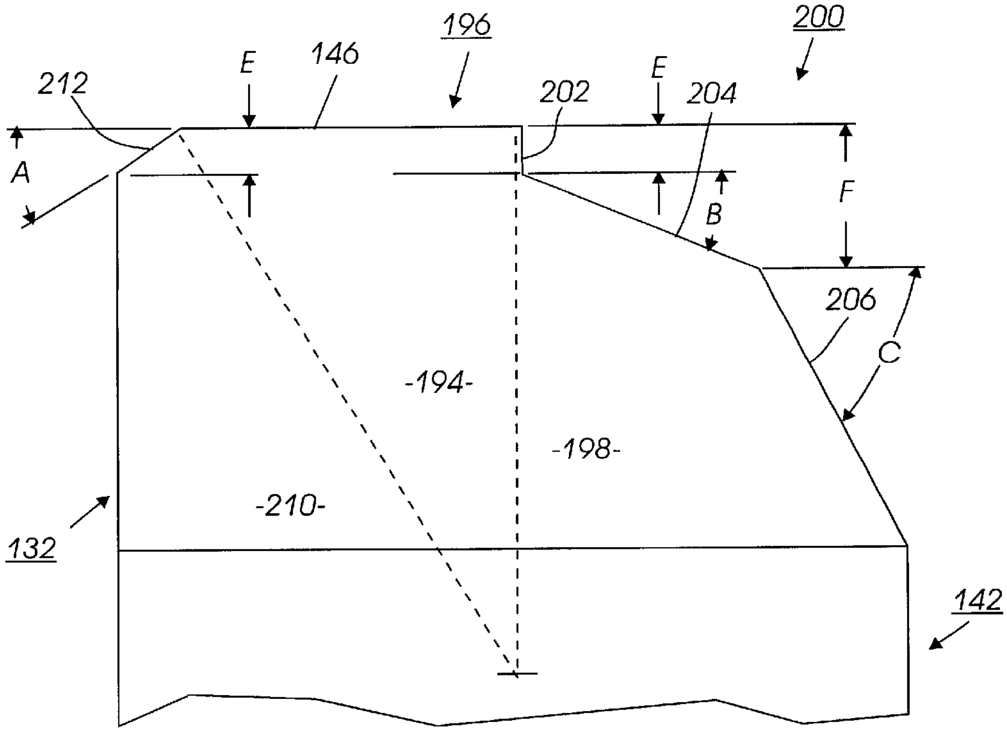
FIG. 7A is a partial plan view of a unidirectional leveling blade for use with the turning apparatus of FIG. 1.

Referring now to FIG. 7A, a typical configuration of a blade 132 is shown. As shown in FIG. 7A, the blade 132 preferably consists of three sections. First section 195 forms a first portion 196 of free end 146 of the blade 132. The first portion 196 of the free end 146 extends substantially parallel to the longitudinal axis 116 of the roll 48 (see FIG. 1). Referring again to FIG. 7A, the blade 132 also has a second section 198 which lays adjacent the first section 195. The second section 198 is connected to the first section 195 and forms a second portion 200 of free end 146. The second portion 200 extends inwardly from the first portion 196.

The first portion 196 of the free end 146 forms a relatively flat fluid encounter zone which planes and deflects upon interaction with the metered fluid stream. This portion of the blade improves fluid wetting on the periphery 104 of the roll 48 over the wetting if the stream were to flow unimpeded. The point of tangency 194 of the blade 132 to the roll 48 is preferably within the portion of first section 195 defined by length E'.

Applicants have found that second portion 200 of the free end 146 preferably has three zones. First zone 202 is located adjacent first portion 196 and forms an angle of approximately 90 degrees with first portion 196. The first zone 202 has a length E' of approximately 0.10 to 0.60 inches with 0.2 inches being preferred. Extending from first zone 202 is a second zone 204 of the second portion 200. The second zone 204 forms an angle B' with respect to first portion 196 of approximately 5 to 35 degrees with 20 degrees being preferred. The second zone 204 extends toward fixed end 142 of the blade 132 a distance F' from the first portion 196 of approximately 0.8 inches. A third zone 206 extends inwardly from second zone 204 at an angle C' of from between 35 to 85 degrees with 65 degrees being preferred. The third zone 206 extends inwardly from first portion 196 a distance of approximately 0.32 inches.

The blade 132 preferably further includes a third section 210 which is adjacent first section 195 and spaced from second section 198. The third section 210 includes a third portion 212 which extends inwardly from first portion 196 a distance G' of approximately 0.2 inches. The third portion 212 forms an angle A' of approximately 45 degrees with the first portion 196.

The first zone 202 and the second zone 204 of the second portion 200 of the blade 132 form a zone which enables gentle pressure relief on the fluid layer prior to its detachment from the blade 132. The third zone 206 of the second portion 200 transitions the blade 132 rapidly from the coating area and enables it to remain clean. The second zone and third zone 202 and 204, respectively, also permit the axial translation of the blade 132 on the periphery of roll 48 at ends 156 and 158 of the core 150 of roll 48.

It should be appreciated that the relative dimensions of the features of the blade and the overall configuration of the blade should be selected based on the many of the operating characteristics of the flow coating process and in particular should be quite dependent on the viscosity of the coating solution.

Figure 7B:
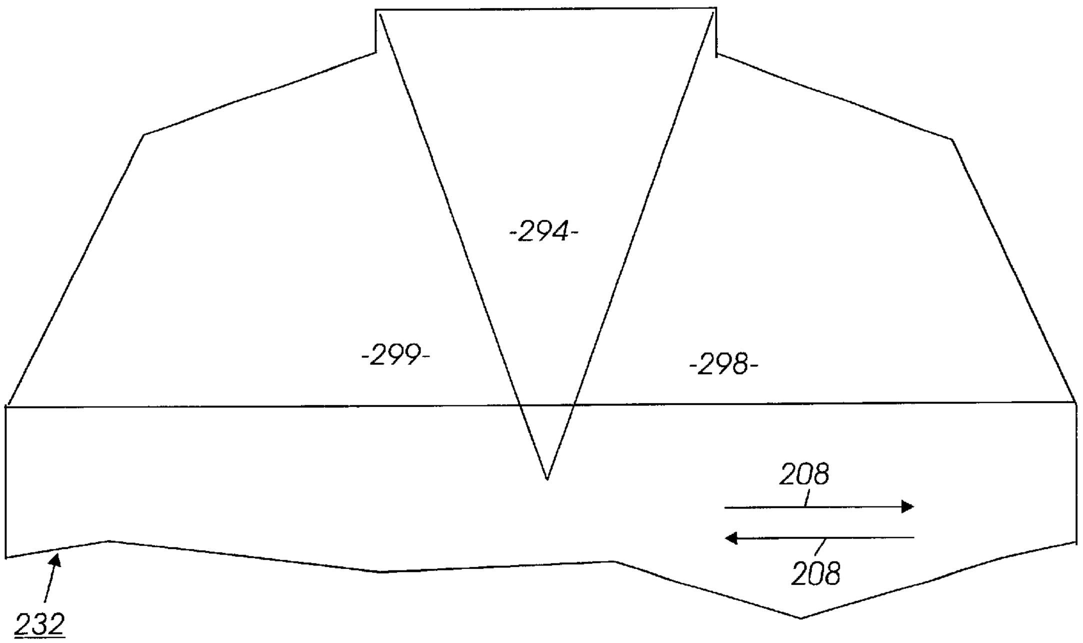
FIG. 7B is a partial plan view of a bi-directional leveling blade for use with the turning apparatus of FIG. 1.

Referring now to FIG. 7B, blade 232 is shown. Blade 232 is similar in configuration to blade 132 of FIG. 7A except that blade 232 has a symmetrical shape. Blade 232 is like blade 132 and includes three sections. A first section 294 similar to section 195 of blade 132, a second section 298 similar to second section 198 of blade 132 and a third section 299 which unlike third section 210 of blade 132 is similar to first section 294 and symmetrical about section 298 of blade 232. Blade 232 is designed so that the blade may travel both in first direction 208 and second direction 218. Such a configuration prevents the lost time in returning the slide of the lathe to the original end of the roll.

Figure 8:
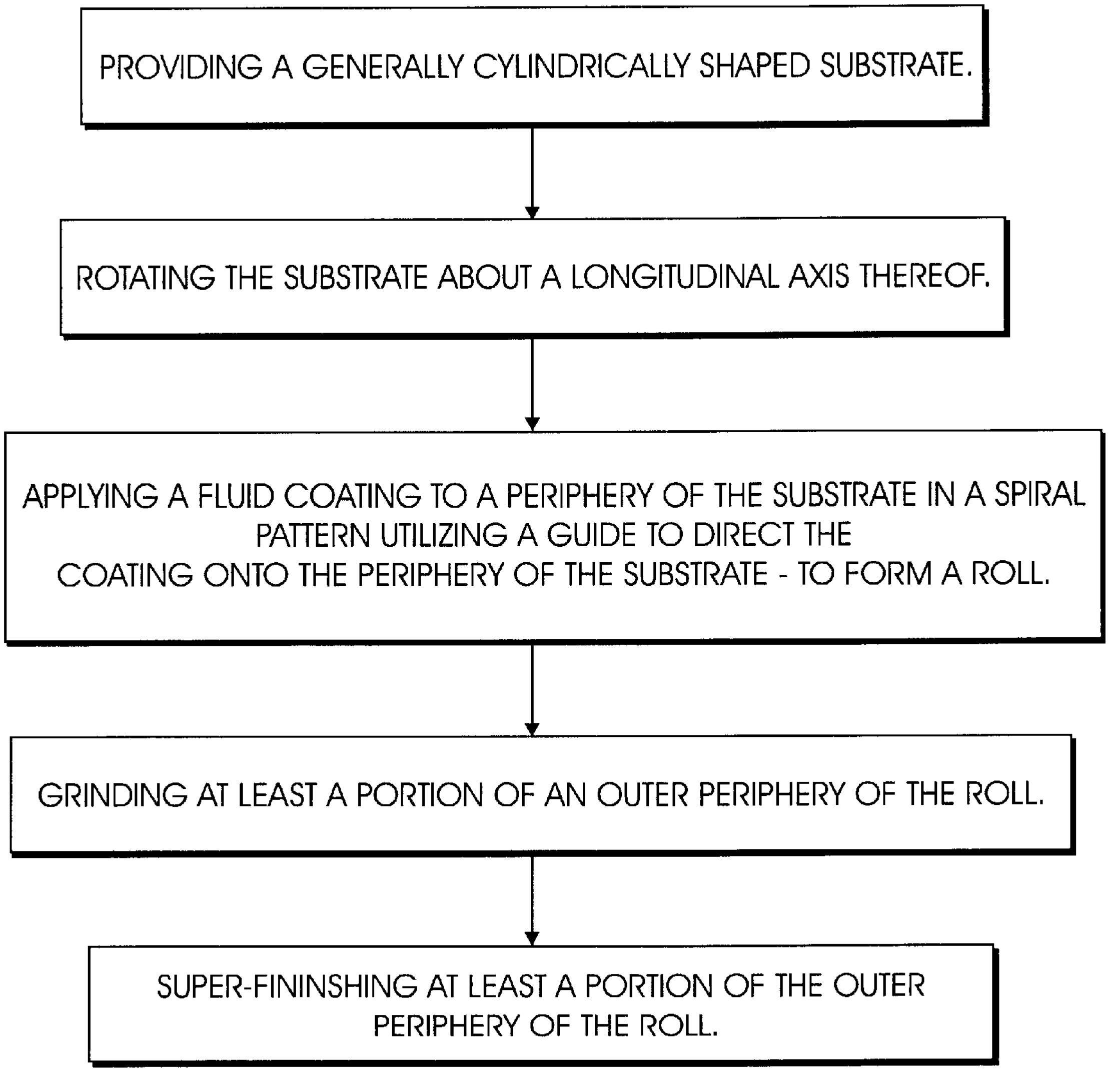
FIG. 8 is a block diagram of the method of manufacturing the fuser roll utilizing flow coating according to the present invention.

Referring now to FIG. 8, a process for flow coating printer rolls or belts, for example fuser rolls is described. The flow coating process for a fuser roll includes first the step providing a generally cylindrically shaped substrate. The substrate is rotated about a longitudinal axis of the substrate. A fluid coating is applied to the periphery of the substrate in a spiral pattern utilizing a guide to direct the coating onto the periphery of the substrate. After the coating is fully applied, the coating is ground to a precision tolerance. To obtain optimum surface configuration, subsequent operations such as super-finishing or polishing the outer periphery may also be required.

As stated earlier, this flow coating process is applicable for multi layered printer rolls or belts, for example fuser rolls, e.g. the multi layered fuser roll of U.S. Pat. No. 5,217,837 to Henry et al, the relative portions thereof incorporated herein by reference. The surface condition and the geometry and size of the substrate may require accurate tolerances. Further, the substrate may need preparation to obtain a surface to which the fluid coating may adequately adhere. Applicants have also found that to obtain satisfactory results for rolls operating at elevated temperatures and pressures, for example fuser rolls, a preparation of an adhesive coating to the substrate may be required. The adhesive coating may be any suitable material, e.g. silane. Such an adhesive layer is disclosed in U.S. Pat. No. 5,219,612 to Bingham and in U.S. Pat. No. 5,049,444 to Bingham, the relevant portions thereof incorporated herein by reference.

Applicants have further found that a roll coated fuser roll may be made including coated layers of different materials. For example, a multi layered fuser roll may be utilized from this process such as a fuser roll described in U.S. Pat. No. 5,217,837 to Henry et al. Such a roll includes a top coating fabricated from a material to obtain optimum release of toner from the roll and a base coat fabricated from a material to obtain optimum thermal transfer. The coating may be applied in a solution with coating additives. Such a solution with approximately 28 percent solids has been found to be effective. The coating may be applied at any satisfactory rate. Applicants have found that a rate of 0.002 inches per pass is effective.

When using the flow coating process to produce belts the belts are preferably mounted on a cylindrical mandrill and processed in a manner process similar to that heretofore described with the outer surface of the belt being coated.

By providing a flow coating process for applying polymeric surfaces to a fuser roll, fuser rolls may be manufactured more quickly with less cost and with fewer volatile chemical emissions.

By providing a flow coating process for a fuser roll, a process may be obtained with improved quality and reduced air pockets from the curing of volatile chemicals from the fuser roll flow coating material.

By providing a flow coating process for a fuser roll with an accurately controlled application of coating solution, a process may be obtained with extremely accurate coating thickness. The improved accuracy in coating thickness may reduce the grinding required or eliminate the need to grind the periphery of the roll entirely.

By providing a flow coating process for a fuser roll with an accurately controlled application of coating solution, an extremely smooth coating free of air pockets and quality defects and with an extremely accurate coating thickness may be obtained. When used in color xerography, the smooth coating and accurate thickness may be such that subsequent operations such as grinding and polishing may not be required.

By providing a flow coating process an improved fuser roll may be obtained at a lower cost with less volatile chemicals escaping into the area requiring less disposal of the volatile material.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A polymeric printing member for use in an printing machine, said member comprising:

a substrate; and a coating applied to said substrate; said coating applied to said substrate by rotating said substrate about a longitudinal axis thereof and applying said coating from an applicator to said substrate in a spiral pattern in a controlled amount.

2. The member according to claim 1, wherein said coating is applied to said substrate in a spiral pattern with a guide having a surface thereof parallel to and slightly spaced from the periphery of said substrate by said coating.

3. The member according to claim 1, further comprising an adhesive coating positioned between said substrate and said first mentioned coating.

4. The member according to claim 3, wherein said adhesive coating comprises silane.

5. The member according to claim 1, wherein said adhesive coating has a thickness of approximately 0.000002–0.0008 inches.

6. The member according to claim 1, wherein said coating comprises a flouroelastomer.

7. The member according to claim 1, wherein the member comprises a roll.

8. The member according to claim 1, wherein the member comprises a belt.

9. A printing machine including a polymeric printing member, said roll comprising:

a substrate; and an coating applied to said substrate;, said coating applied to said substrate by rotating said substrate about a longitudinal axis thereof and applying said coating from an applicator to said substrate in a spiral pattern in a controlled amount.

10. The printing machine according to claim 9, wherein said coating is applied to said substrate in a spiral pattern with a guide having a surface thereof parallel to and slightly spaced from the periphery of said substrate by said coating.

11. The printing machine according to claim 9, further comprising an adhesive coating positioned between said substrate and said first mentioned coating.

12. The printing machine according to claim 11, wherein said adhesive coating comprises silane.

13. The printing machine according to claim 11, wherein said adhesive coating has a thickness of approximately 0.000002–0.0008 inches.

14. The printing machine according to claim 9, wherein said coating comprises a flouroelastomer.

15. The printing machine according to claim 9, wherein the member comprises a roll.

16. The printing machine according to claim 9, wherein the member comprises a belt.

17. A polymeric printing member, having a substrate and an external coating applied to said substrate, made by die process comprising:

providing a substantially cylindrically shaped substrate;

rotating the substrate about a longitudinal axis thereof; and applying an external coating from an applicator in a stream in a substantially vertically downward direction to an outer periphery of the substrate, said stream contacting the outer periphery of the substrate at a position above a horizontal centerline of the substrate and contacting the outer periphery of the substrate at a position spaced from an uppermost location of the substrate in the direction of the rotation of the substrate, wherein the dynamics of the rotation of the substrate and the position of the stream on the substrate assist in the uniform distribution of the coating onto the substrate.

18. The member according to claim 1, wherein the member comprises a roll.

19. The member according to claim 1, wherein the member comprises a belt.

* * * * *